United States Patent
Najmolhoda et al.

(10) Patent No.: US 10,260,536 B2
(45) Date of Patent: *Apr. 16, 2019

(54) METHOD AND TEMPERATURE TRANSMISSION COMPENSATION

(71) Applicant: FLEXTRONICS AP, LLC, San Jose, CA (US)

(72) Inventors: Hamid Najmolhoda, Grand Rapids, MI (US); David Seid, Conklin, MI (US)

(73) Assignee: FLEXTRONICS AP, LLC, San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/144,348

(22) Filed: May 2, 2016

(65) Prior Publication Data
US 2016/0245314 A1    Aug. 25, 2016

Related U.S. Application Data

(63) Continuation of application No. 14/221,861, filed on Mar. 21, 2014, now Pat. No. 9,329,097.

(51) Int. Cl.
*G01L 19/04* (2006.01)
*F16D 48/06* (2006.01)
(Continued)

(52) U.S. Cl.
CPC .......... *F15B 19/002* (2013.01); *F15B 21/045* (2013.01); *F16D 48/06* (2013.01);
(Continued)

(58) Field of Classification Search
None
See application file for complete search history.

(56) References Cited

U.S. PATENT DOCUMENTS 6,364,281 B1 * 4/2002 DeLand .............. F16K 31/0675
251/129.04
6,877,487 B2    4/2005 Vogt
(Continued)

FOREIGN PATENT DOCUMENTS

| DE | 10148346 A1 | 5/2002 |
| EP | 0620377 A1 | 10/1994 |
| WO | 20130142893 A1 | 10/2013 |

*Primary Examiner* — Andre J Allen
(74) *Attorney, Agent, or Firm* — Volpe and Koenig, P.C.

(57) ABSTRACT

A method is disclosed for determining off-temperature behavior of a solenoid fluid control valve. The method comprises performing a current sweep at a first temperature. The method further comprises choosing a first and second characterization control pressure for characterizing the solenoid fluid control valve. A first current may be determined that corresponds to the first characterization control pressure based on the current sweep, and a first metric may be assigned to the solenoid fluid control valve based on the first current. A second current corresponding to the second characterization control pressure may be determined based on the current sweep, and a second metric may be assigned to the solenoid fluid control valve based on the second current. Information regarding the behavior of the solenoid fluid control valve at a second temperature may be determined based on the first and second metrics.

20 Claims, 11 Drawing Sheets

(51) Int. Cl.
  *F15B 21/04*   (2006.01)
  *G05D 16/20*   (2006.01)
  *F15B 19/00*   (2006.01)
  *F15B 21/045*  (2019.01)
  *F16K 31/06*   (2006.01)
  *F16K 37/00*   (2006.01)

(52) U.S. Cl.
  CPC ........ *F16D 48/066* (2013.01); *F16K 31/0675* (2013.01); *F16K 37/0083* (2013.01); *G01L 19/04* (2013.01); *G05D 16/2013* (2013.01); *F16D 2500/3024* (2013.01); *F16D 2500/3168* (2013.01); *F16D 2500/70294* (2013.01); *F16D 2500/70406* (2013.01); *F16D 2500/70418* (2013.01)

(56) References Cited

U.S. PATENT DOCUMENTS

| | | | |
|---|---|---|---|
| 7,085,628 | B2 | 8/2006 | Ohmi et al. |
| 9,518,679 | B2 * | 12/2016 | Seid ................... G05D 16/2013 |
| 2009/0222179 | A1 | 9/2009 | Zheng |

* cited by examiner

TEMPERATURE CODE

| | |
|---|---|
| A1 | FALSE |
| A2 | FALSE |
| A3 | FALSE |
| B1 | FALSE |
| B2 | FALSE |
| B3 | FALSE |
| C1 | FALSE |
| C2 | TRUE — 700 |
| C3 | FALSE |

FIG. 7

CODE C2 PRESSURE SHIFT TABLE IN kPa

| | NORMALLY LOW COMMANDED CURRENT (AMPS) | | | | | | | |
|---|---|---|---|---|---|---|---|---|
| | 0.200 | 0.300 | 0.425 | 0.500 | 0.600 | 0.800 | 1.000 |
| -20C | 34.709 | 21.442 | -5.998 | -20.520 | -34.995 | -38.166 | -9.029 |
| 0C | 30.540 | 16.211 | -10.896 | -24.707 | -38.387 | -41.474 | -13.012 |
| 10C | 23.869 | 7.887 | -16.415 | -27.591 | -38.241 | -40.479 | -15.429 |
| 20C | 15.828 | -3.822 | -20.515 | -25.624 | -30.092 | -31.432 | -15.334 |
| 35C | 2.894 | -15.747 | -17.473 | -15.167 | -12.391 | -7.658 | -8.968 |
| 45C | 0.662 | -6.885 | -7.242 | -6.086 | -4.109 | 0.324 | -3.807 |
| 55C | 2.184 | 1.857 | 1.778 | 1.807 | 2.835 | 5.441 | 1.710 |
| 62C | 2.636 | 3.225 | 3.398 | 3.958 | 4.495 | 5.649 | 1.986 |
| 70C | 0.000 | 0.000 | 0.000 | 0.000 | 0.000 | 0.000 | 0.000 |
| 99C | 3.275 | 5.493 | 4.538 | 3.852 | 2.617 | 0.643 | -1.671 |
| 110C | 0.472 | -2.428 | 1.714 | 0.953 | -0.997 | -4.332 | -4.955 |
| 130C | -0.750 | -9.418 | -9.119 | -9.387 | -11.787 | -18.323 | -17.330 |

TEMPERATURE (DEG C)

FIG. 9

METHOD AND TEMPERATURE TRANSMISSION COMPENSATION

CROSS REFERENCE TO RELATED APPLICATION

This application is a continuation of U.S. patent application Ser. No. 14/221,861, filed Mar. 21, 2014, which is incorporated by reference as if fully set forth.

FIELD OF INVENTION

The present invention relates to determining off-temperature behavior of an electromagnetic solenoid actuator having an armature mechanism that drives a fluid control element.

BACKGROUND

Solenoid fluid control valves are often used to control fluid pressure in a variety of systems, including clutch mechanisms and other devices in an automobile. The environment in which these actuators must function may have a wide temperature range, leading to variation in the solenoid fluid control valve's response to a given command current. Knowledge of the variation in the valve's response may be used to optimize the command current for a given temperature. Such knowledge, however, is not easily acquired and communicated for each individual solenoid that a manufacturer produces and provides to a customer.

SUMMARY

A method is disclosed for determining off-temperature behavior of a solenoid fluid control valve. The method comprises performing a current sweep wherein a current is run through a coil of the solenoid fluid control valve and a resulting control pressure is measured as a function of the current. The control sweep is performed at a first temperature. The method further comprises choosing a first and second characterization control pressure for characterizing the solenoid fluid control valve. A first current may be determined that corresponds to the first characterization control pressure based on the current sweep, and a first metric may be assigned to the solenoid fluid control valve based on the first current. A second current corresponding to the second characterization control pressure may be determined based on the current sweep, and a second metric may be assigned to the solenoid fluid control valve based on the second current. Information regarding the behavior of the solenoid fluid control valve at a second temperature may be determined based on the first and second metrics.

BRIEF DESCRIPTION OF THE DRAWINGS

FIG. 7 depicts the reading of the temperature code;

FIG. 9 shows a pressure shift table for a solenoid with temperature code C2;

DETAILED DESCRIPTION OF THE PREFERRED EMBODIMENTS

The solenoid fluid control valve manufacturing process introduces variations in valve performance and response. These variations may be particularly pronounced at extreme temperatures. When a solenoid fluid control valve is used in a transmission, error in the output pressure for a given command current may result in lower shift quality. Accordingly, knowledge of the response of a given solenoid fluid control valve to a particular command current allows a user to choose an appropriate command current for a given temperature. In the prior art, this knowledge may be based on a single transfer function, and may provide information that has been averaged for a large number of solenoids. This process is illustrated in FIG. 1.

Figure 1:
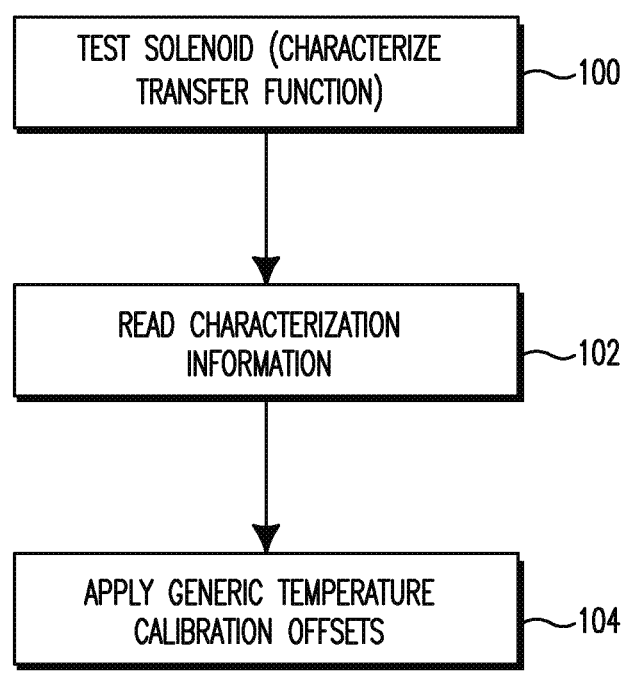
FIG. 1 shows a prior art transmission temperature compensation method.
Figure 2:
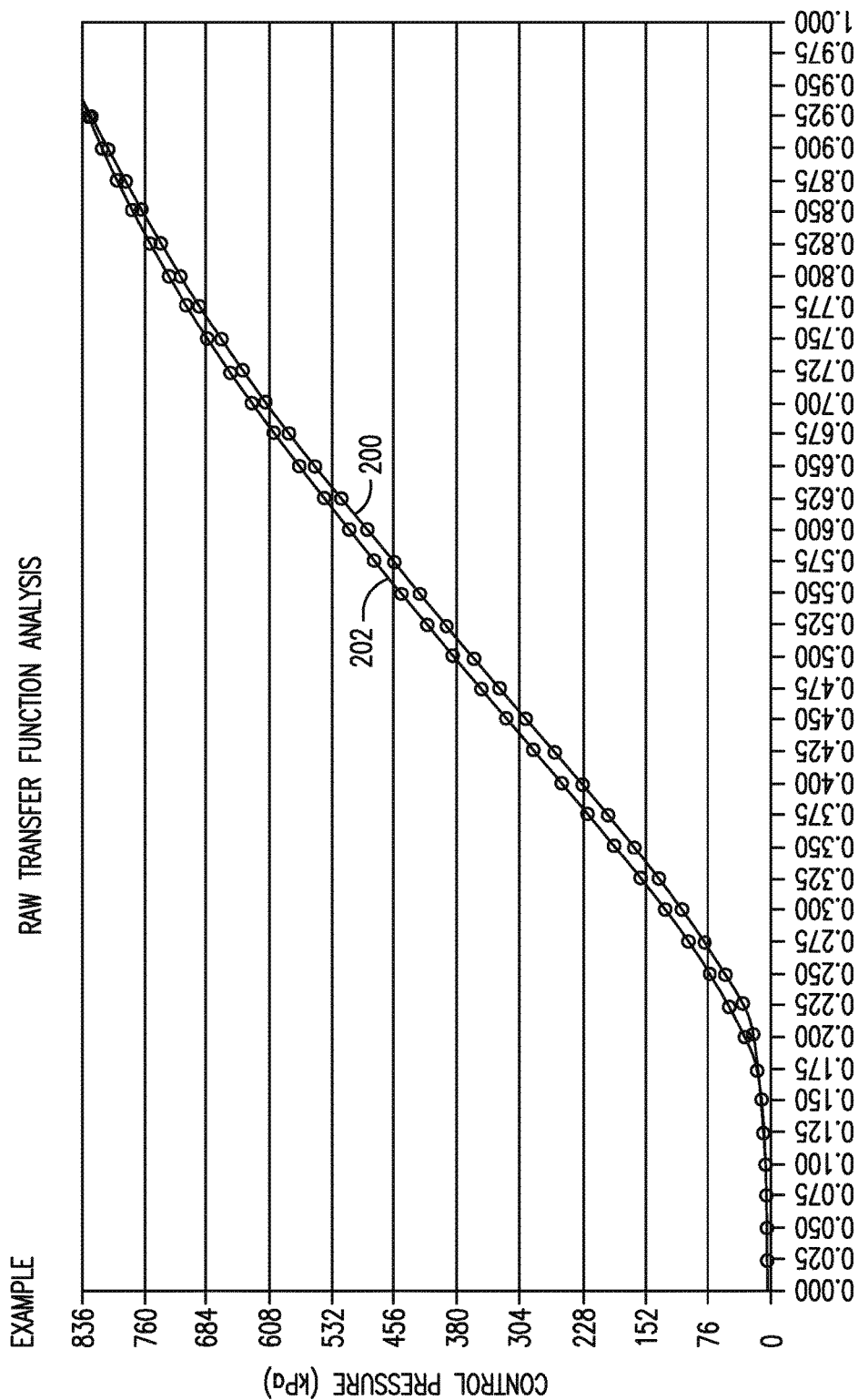
FIG. 2 illustrates a current sweep and the resulting transfer function.

Referring to FIG. 1, a sweep of the command current for a particular solenoid may be performed, and the corresponding pressure for a plurality of input points may be recorded (step 100). An example of the control pressure (Amps) versus command current (kPa) data is shown in FIG. 2. A typical solenoid fluid control valve may have a coil, and an armature that moves in response to a command current through the coil. The motion of the armature may result in the motion of a spool that regulates fluid flow from a supply port to a control port. The fluid pressure at the control port, knows as the control pressure, may be measured as a function of the current through the solenoid's coil.

The curve 200 shows control pressure versus command current for an increasing command current. Initially, no fluid flows through the valve. As the command current increases, the armature and spool are displaced, allowing fluid to flow through the valve. This fluid creates an increasing control pressure. The curve 202 shows control pressure versus command current for a decreasing command current.

The curves 200, 202 in FIG. 2 may be used to determine characterization information for the solenoid fluid control valve (step 102). A generic temperature calibration offset may then be applied to the characterization information to determine an expected input current required for a desired output pressure at a given temperature (step 104). The temperature calibration offset may be based on a large population of parts, and may include a significant amount of build and component variation. Accordingly, the offset may do little to correct for temperature changes in the solenoid fluid control valve's environment, and may even inhibit the valve's performance.

Figure 3:
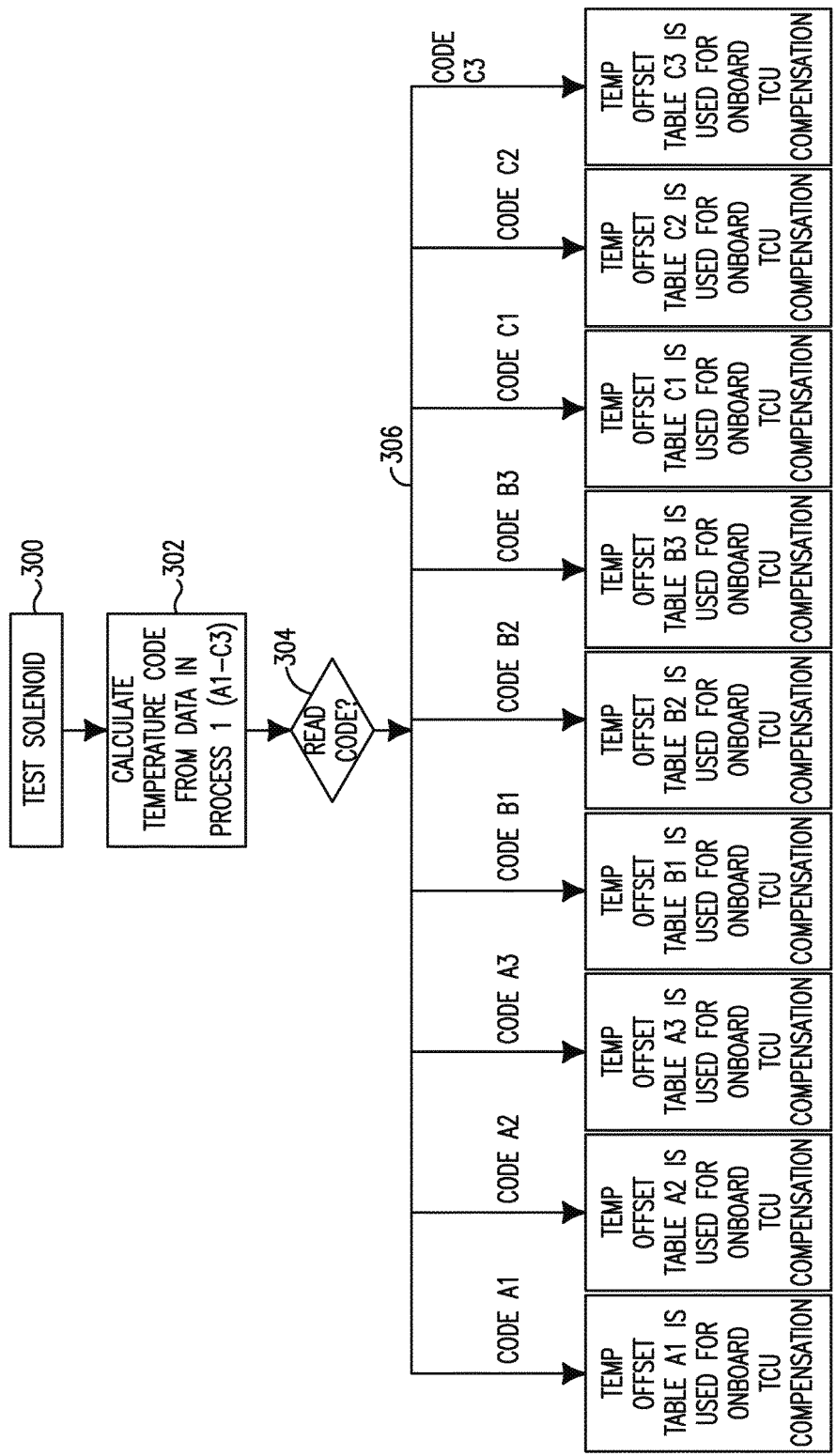
FIG. 3 shows an overview of the inventive temperature accuracy method.

An overview of the inventive temperature accuracy method is shown in FIG. 3. A current sweep may be performed, and a transfer function may be recorded, like the curves 200, 202 shown in FIG. 2 (step 300). A temperature code may be calculated from the transfer function (step 302). Once the temperature code is read (step 304), a temperature offset table corresponding to the temperature code may be used to determine the command current for a desired pressure at a given temperature (step 306). This method is described in more detail below.

Figure 4:
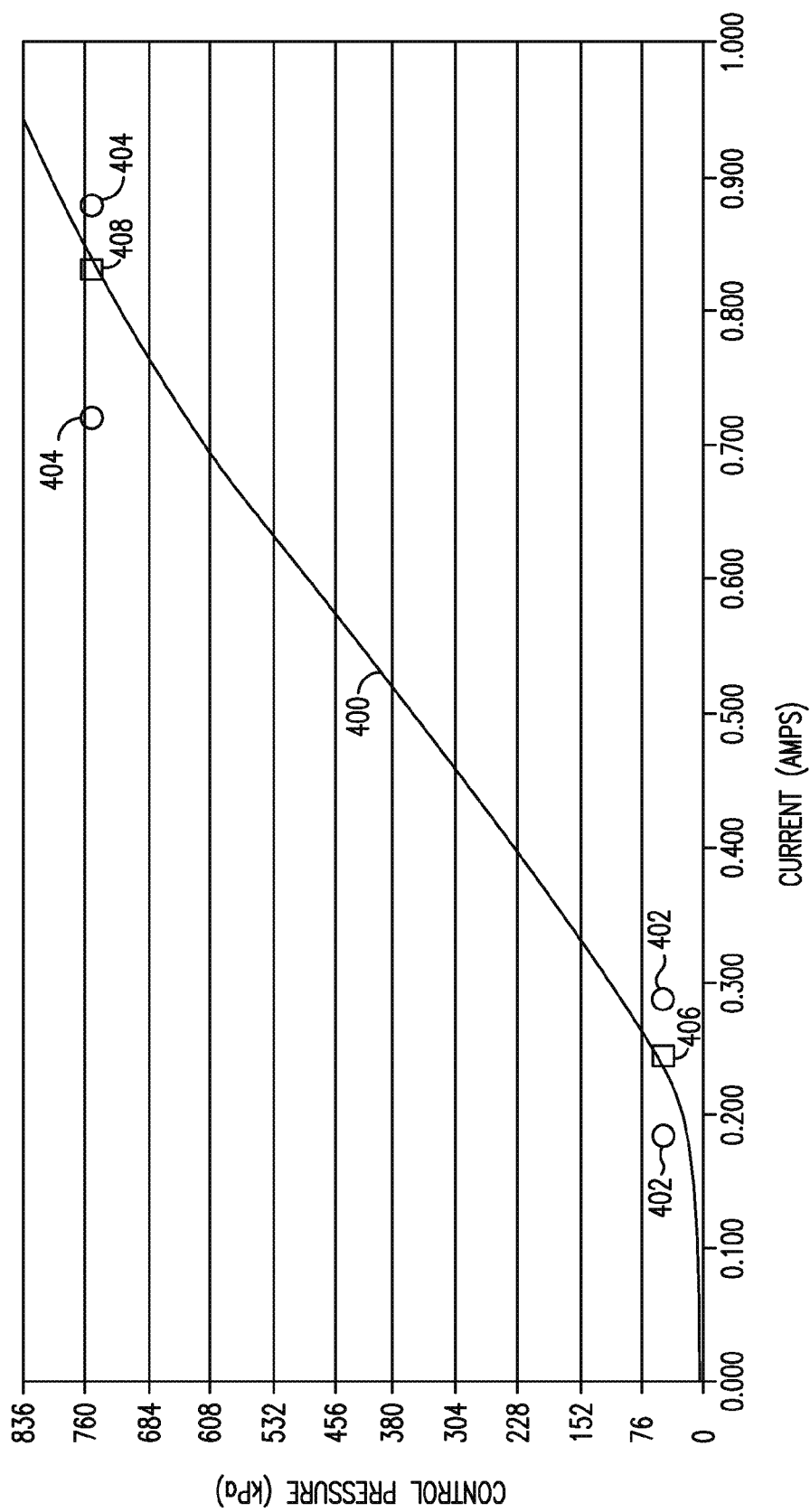
FIG. 4 shows two pressure gates used to determine a temperature code.

The method begins with a sweep of the command current. The sweep may be performed at a temperature that is close to a normal operating temperature of the solenoid fluid control valve's environment. For example, if the solenoid fluid control valve is to be used in a transmission, the sweep may be performed at the normal operating temperature of a transmission, approximately 70° C.-80° C. A curve 400 for an increasing command current in a solenoid fluid control valve at 70° C. is shown in FIG. 4. A number of characterization pressures may be chosen for characterizing the transfer function. In one embodiment, two characterization pressures are chosen, one at each end of the curve 400. In the example shown in FIG. 4, the characterization pressures are 50 kPa and 750 kPa. 50 kPa corresponds to the lift-off region of the solenoid fluid control valve, when fluid has just started to pass through the valve. This may be considered a low flow region. 750 kPa corresponds to a high flow region, where the fluid pressure is nearing the maximum fluid pressure. Using the transfer function 400, a current corresponding to each of the characterization pressures may be identified. FIG. 4 shows two "gates" 402, 404 that define an expected range in command current for the two characterization pressures. The points 406, 408 show that the corresponding command currents for the characterization pressures 50 kPa and 750 kPa are 0.245 Amps and 0.832 Amps, respectively. These may be referred to as characterization currents.

Figure 5:
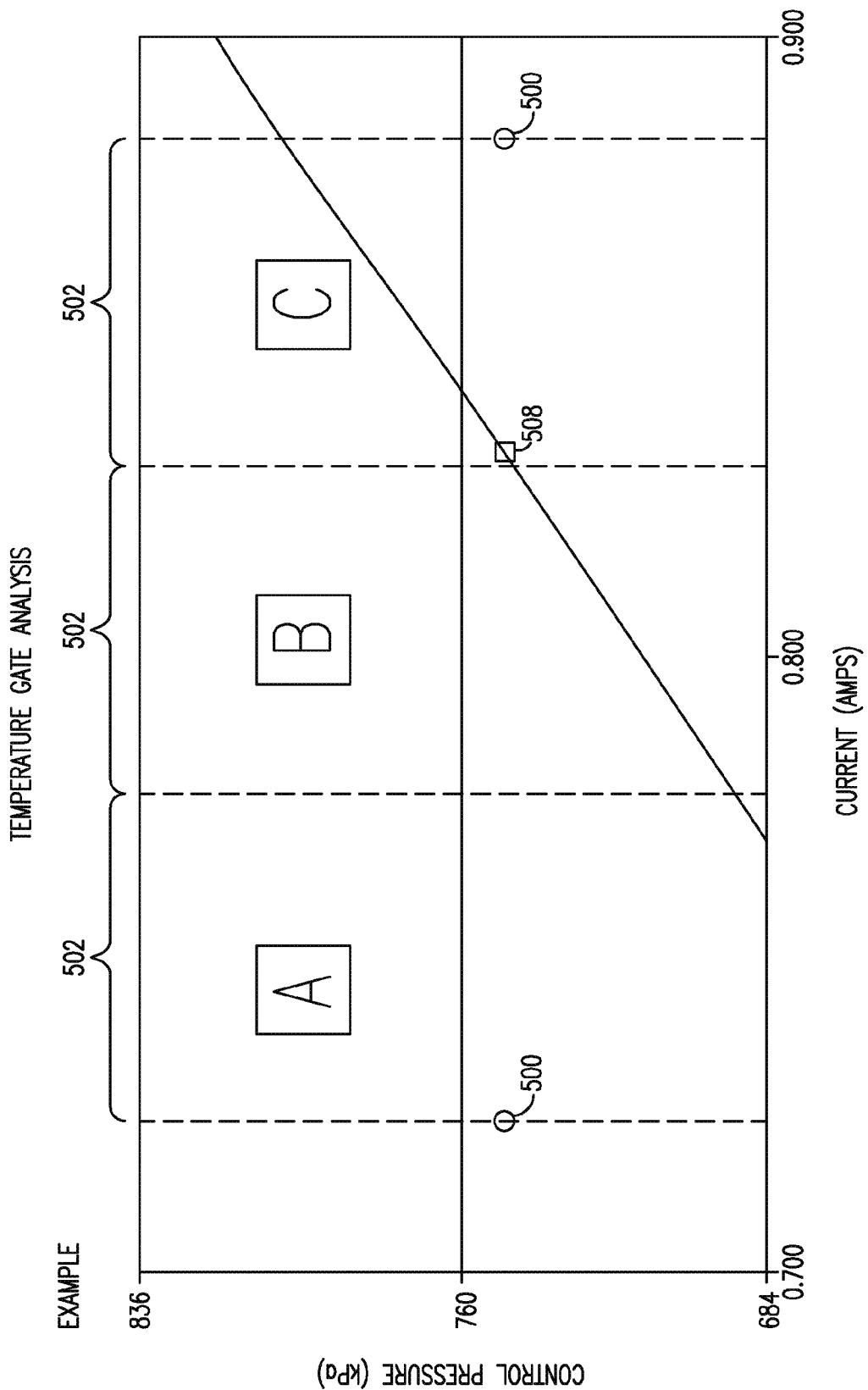
FIG. 5 illustrates how the region within the 750 kPa pressure gate may be divided into three regions.

Referring to FIG. 5, the region within the 750 kPa gate 500 may be split into a number of smaller regions. In the example shown in FIG. 5, regions A 502, B 504, and C 506 span the gate 500. The characteristic current 508 lies within region C 506, and accordingly the solenoid is assigned letter code C. This letter code acts as a first metric for determining the solenoid fluid control valve's behavior at other temperatures.

Figure 6:
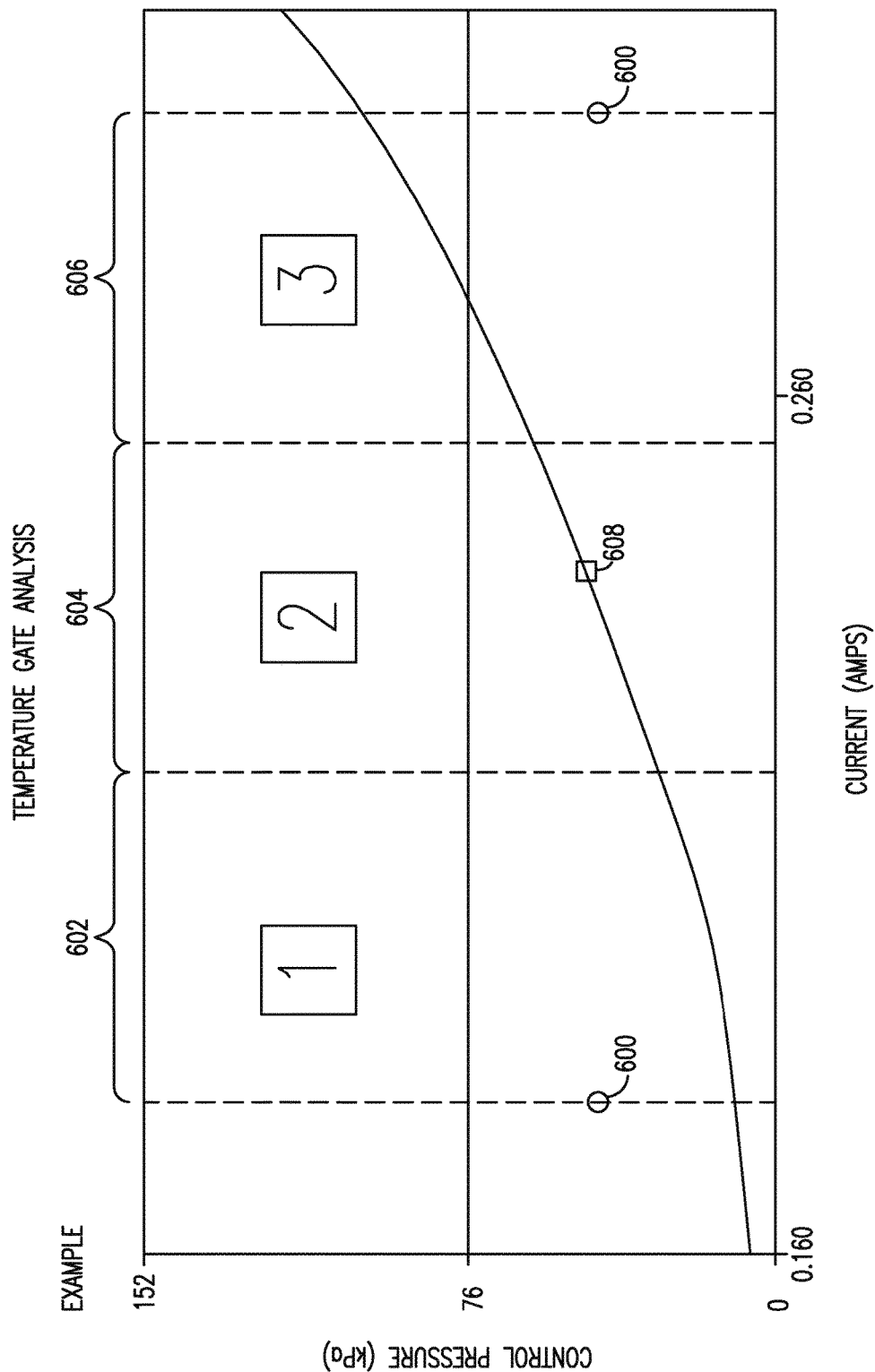
FIG. 6 illustrates how the region within the 50 kPa pressure gate may be divided into three regions.

A similar process may be performed for each of the characteristic pressures. The present embodiment includes two characteristic pressures, and thus the procedure is performed a second time. Referring to FIG. 6, the region within the gate 600 is divided into three sections, region 1 602, region 2 604, and region 3 606. The characterization current 608 lies in region 2, and the solenoid is assigned number code 2. This number code acts as a second metric for determining the solenoid fluid control valve's behavior at other temperatures.

Referring to FIG. 7, the letter and number codes are combined to create the temperature code of the solenoid. Because there were three possible letter codes and three possible number codes in this example, a total of nine letter-number combinations is possible. As shown by the "TRUE" indicator 700, the solenoid of the present example has a temperature code C2.

Figure 8:
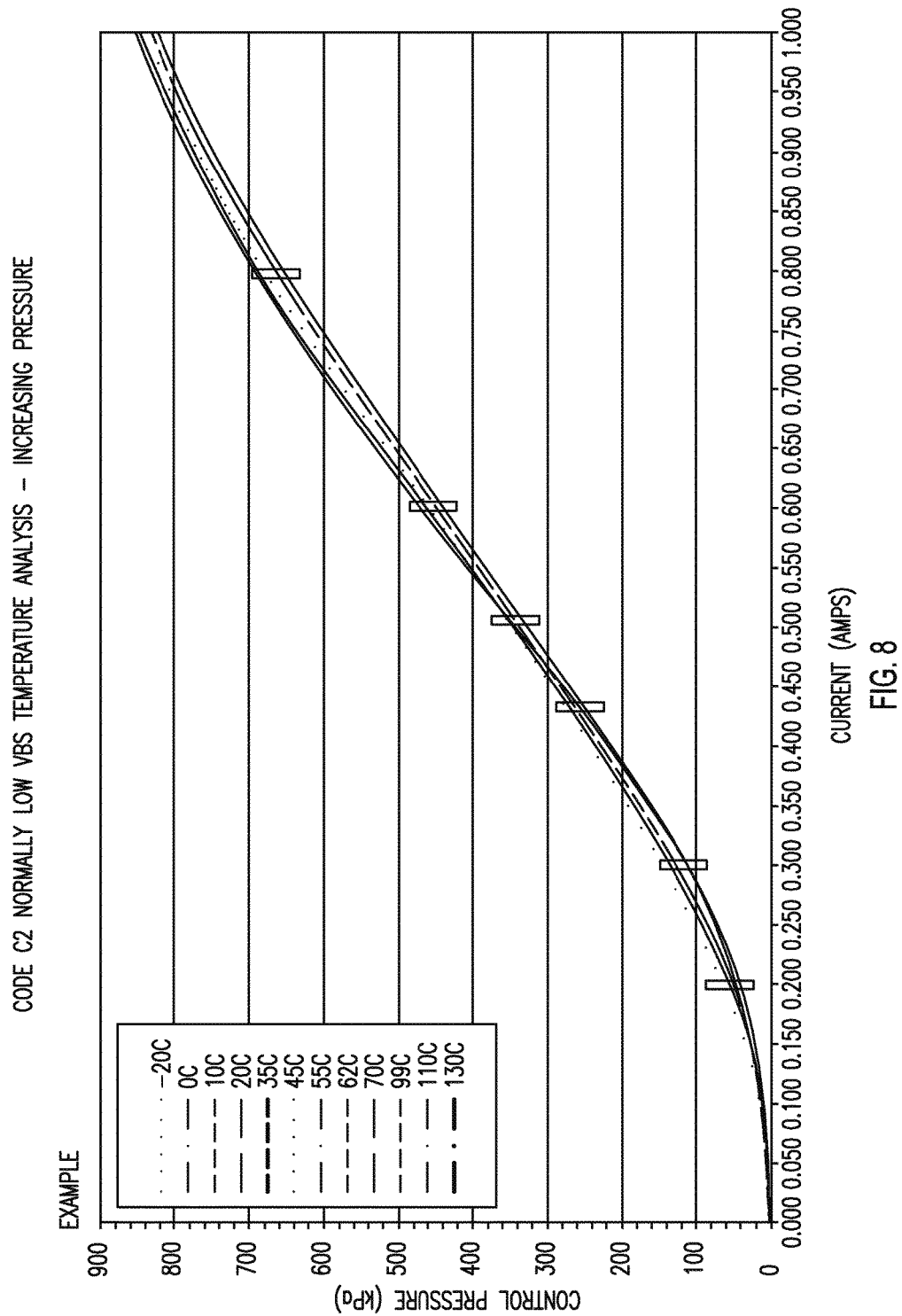
FIG. 8 shows expected control pressure (kPa) versus current (A) curves for a solenoid with temperature code C2 at a variety of temperatures.

The temperature code may be used to identify characteristic behavior of the solenoid at temperatures other than the characterization temperature. For example, current sweeps may be performed on a number of solenoids with temperature code C2 at a plurality of temperatures. The data for each temperature may be averaged to create an expected curve for that temperature. FIG. 8 shows curves for 12 temperatures ranging from −20° C. to 130° C. Each of the curves is an average of data collected from a plurality of solenoids having the temperature code C2.

Each of the curves in FIG. 8 includes seven data points. These data points may be combined into a look-up table, for example the table shown in FIG. 9. The table shows an expected pressure (kPa) for a commanded current (A) at a particular temperature (° C.) for a solenoid with a temperature code of C2. A similar table may be created for each of the other eight temperature codes.

Figure 10:
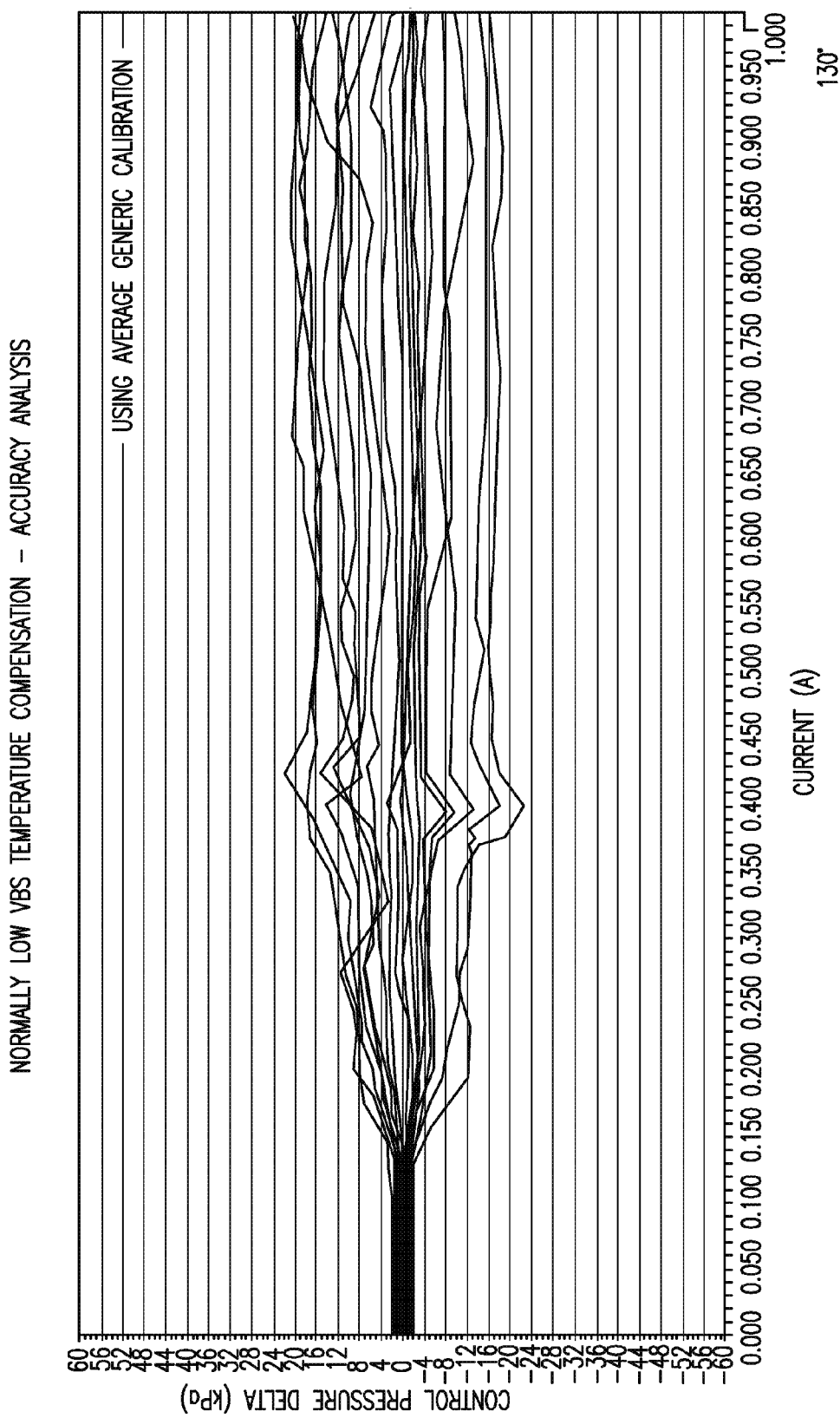
FIG. 10 shows a control pressure delta (kPa) versus current (A) for 64 solenoids using average generic calibration.
Figure 11:
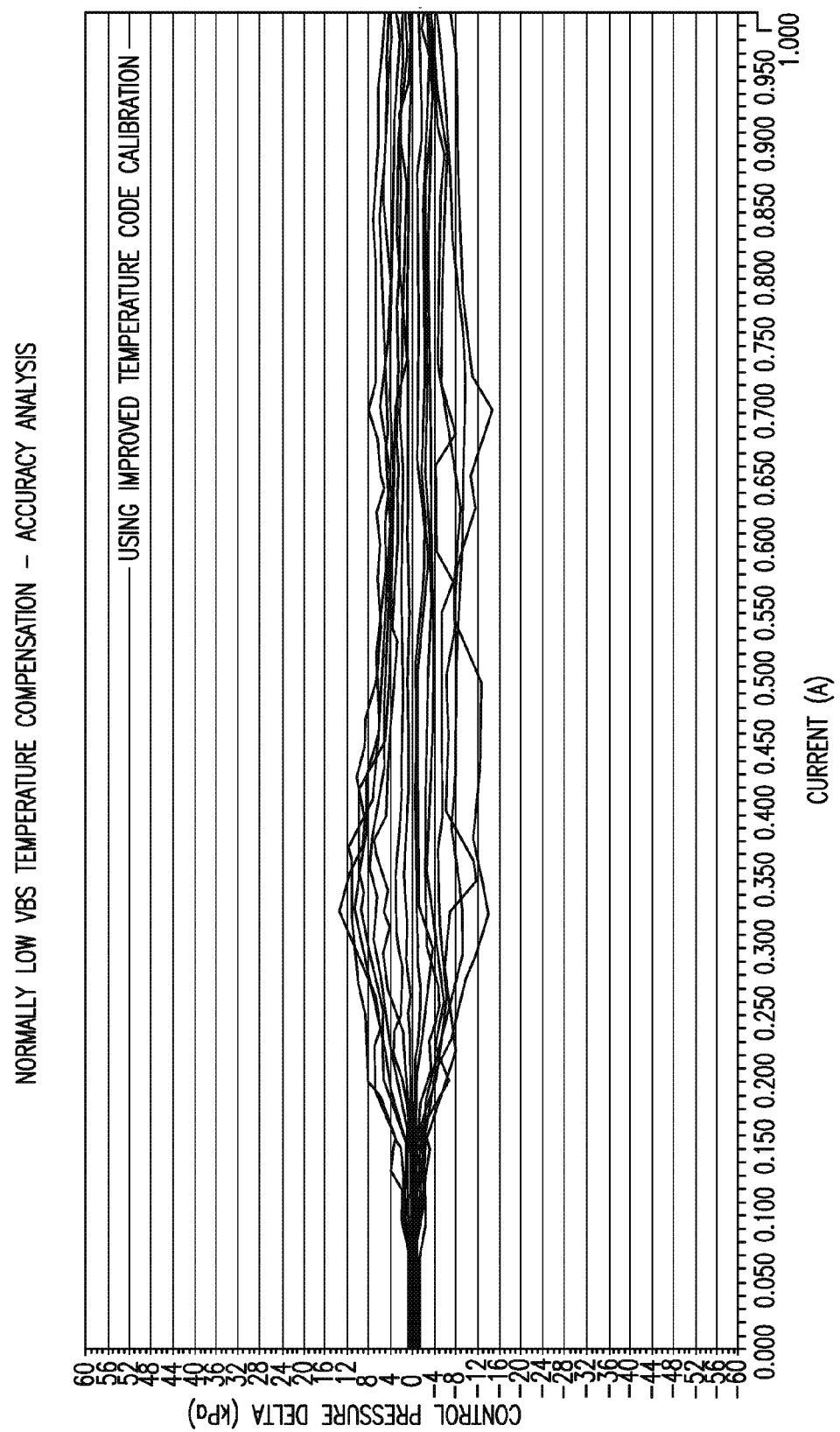
FIG. 11 shows a control pressure delta (kPa) versus current (A) for 64 solenoids using the inventive temperature accuracy method.

The inventive temperature accuracy method may significantly reduce the error in solenoid performance. FIG. 10 shows a control pressure delta (kPa) versus command current (A) for a temperature of 130° C. The control pressure delta is defined as the difference between the expected pressure and the actual (measured) pressure for a given command current. FIG. 10 employs the prior art method, wherein a generic temperature calibration offset is applied to the solenoid's characterization information to determine the expected control pressure at 130° C. For 64 randomly chosen solenoids, the range in error is about +/−20 kPa. FIG. 11 shows the control pressure delta (kPa) versus current (A) for the same 64 solenoids, wherein the inventive temperature accuracy method is used to determine the expected pressure at 130° C. As shown in FIG. 11, the range in error is reduced to about +/−12 kPa, nearly half that of the prior art method.

The inventive temperature accuracy method reduces error, resulting in more reliable products and, ultimately, higher shift quality. A production facility may compile data for a large number of solenoids, and may average the measured data for valves in each of the nine temperature codes. This data may be used to create a look-up table, such as the table shown in FIG. 9. A look-up table for each of the nine temperature codes may be provided to the customers of the production facility.

Additionally, before a product is shipped, it may be characterized as in FIGS. 4-6 to determine its temperature code. This code may be added to the product's label or casing, or to information available by scanning the product's bar code. This allows a customer to immediately determine the temperature code and locate the look-up table corresponding to that code. The information in the table may then be used to optimize the command current for a wide range of temperatures. The table may be used to determine a command current for a desired control pressure. Alternatively, the table may be used to identify a control pressure corresponding to a known command current. Note that once the tables are created, a single sweep of a solenoid fluid control valve may be used to determine its temperature characteristics. No further testing on behalf of the manufacturer or the customer is required.

The examples provided herein employed three letter codes and three number codes, giving a total of possible nine temperature codes. Other numbers of letter and number codes may be used. Referring to FIG. 5, the region within the gate 500 may be divided into more or fewer regions, allowing for more or fewer letter codes. Similarly, the region within the gate 600 may be divided into more or fewer regions, and may not have the same number of regions as the gate 500. Referring to FIG. 4, the gate 404 is wider than the gate 402, suggesting a larger variation in command current at a high control pressure. In this case it may be desirable to divide the region within the gate 404 into more regions than the region within gate 402, to account for the wider variation.

Further, in the examples described above, two characterization pressures were chosen, 50 kPa and 750 kPa. Other characterization pressures may be chosen, and other numbers of characterization pressures may be chosen. For example, a third pressure of 400 kPa may be added. The gate associated with this pressure may be divided into two or more regions, and a lower case letter, for example, may be assigned to each of the regions. Each letter code would then have an upper case letter, a number, and a lower case letter, for example, C2a. Other indicators may be used for the each of the characterization pressures.

The method described above is not only applicable to solenoids used in transmissions, but may be applied to any solenoid fluid control valve calibration process. The method allows for a significant increase in accuracy at a variety of temperatures without requiring additional testing of the solenoid in question. Once a pressure shift table has been created for each temperature code, only a single sweep of a solenoid is required to determine the solenoid's temperature code. The method allows for the command current to be optimally calibrated without significant overhead to the manufacturer or customer.

What is claimed is:

1. A method for determining a behavior of a solenoid fluid control valve, the method comprising:
    performing a current sweep that comprises running a current through a coil of the solenoid fluid control valve and measuring a control pressure as a function of the current, wherein the current sweep is performed at a first temperature;
    choosing a first characterization control pressure for characterizing the solenoid fluid control valve;
    determining a first current corresponding to the first characterization control pressure based on the current sweep;
    assigning a first metric to the solenoid fluid control valve based on the first current; and
    determining information regarding a behavior of the solenoid fluid control valve at a second temperature based on the first metric.

2. The method of claim 1, wherein the first temperature is a normal operating temperature of the solenoid fluid control valve.

3. The method of claim 1, wherein the first metric is one of three possible first metrics.

4. The method of claim 1, further comprising:
    choosing a second characterization control pressure for characterizing the solenoid fluid control valve;
    determining a second current corresponding to the second characterization control pressure based on the current sweep;
    assigning a second metric to the solenoid fluid control valve based on the second current; and
    determining information regarding a behavior of the solenoid fluid control valve at a second temperature based on the first and second metrics.

5. The method of claim 4, further comprising:
    choosing a third characterization control pressure;
    determining a third current corresponding to the third characterization control pressure based on the current sweep;
    assigning a third metric to the solenoid fluid control valve based on the first current; and
    determining information regarding the behavior of the solenoid fluid control valve at the second temperature based on the first, second, and third metrics.

6. The method of claim 1 wherein the information regarding the behavior of the solenoid fluid control valve at the second temperature is a current corresponding to a control pressure.

7. The method of claim 1 wherein the information regarding the behavior of the solenoid fluid control valve at the second temperature is a control pressure corresponding to a known current.

8. The method of claim 1 wherein the information regarding the behavior of the solenoid fluid control valve at the second temperature is determined based on a look-up table.

9. The method of claim 8 wherein the look-up table contains an average of measured data from a plurality of solenoid fluid control valves.

10. The method of claim 9 wherein the data is measured at the second temperature.

11. The method of claim 9 wherein each of the plurality of solenoid fluid control valves has a same first metric as the solenoid fluid control valve.

12. The method of claim 1 further comprising defining a first range of possible values for the first current.

13. The method of claim 12 further comprising dividing the first range into a first number of regions.

14. The method of claim 4 further comprising defining a first range of possible values for the first current, and defining a second range of possible values for the second current.

15. The method of claim 14 further comprising dividing the first range into a first number of regions, and dividing the second range into a second number of regions.

16. The method of claim 15 wherein the first number and second number are equal.

17. The method of claim 13 where each of the first number of regions corresponds to a first metric of a plurality of possible first metrics.

18. The method of claim 1, wherein the first characterization control pressure corresponds to a low flow region.

19. The method of claim 4, wherein first characterization control pressure corresponds to a first flow region and the second characterization control pressure corresponds a second flow region, wherein the first flow region has a relatively lower flow than the second flow region.

20. The method of claim 1, further comprising including an indication of the first metric on a casing of the solenoid fluid control valve.

* * * * *